(12) United States Patent
Tani

(10) Patent No.: US 8,068,329 B2
(45) Date of Patent: Nov. 29, 2011

(54) MULTILAYER ELECTRONIC COMPONENT AND METHOD FOR MANUFACTURING THE SAME

(75) Inventor: Masaki Tani, Nyu-gun (JP)

(73) Assignee: Murata Manufacturing Co. Ltd., Kyoto (JP)

( * ) Notice: Subject to any disclaimer, the term of this patent is extended or adjusted under 35 U.S.C. 154(b) by 342 days.

(21) Appl. No.: 12/481,690

(22) Filed: Jun. 10, 2009

(65) Prior Publication Data

US 2009/0310278 A1 Dec. 17, 2009

(30) Foreign Application Priority Data

Jun. 11, 2008 (JP) ................................. 2008-152651
Apr. 15, 2009 (JP) ................................. 2009-099129

(51) Int. Cl.
*H01G 4/228* (2006.01)
(52) U.S. Cl. .................... 361/306.3; 361/311; 361/313; 361/321.1; 361/321.2; 361/306.1
(58) Field of Classification Search ............... 361/306.3, 361/301.2, 301.4, 308.1, 311–313, 306.1, 361/321.1, 321.2, 303, 305
See application file for complete search history.

(56) References Cited

U.S. PATENT DOCUMENTS

| | | | |
|---|---|---|---|
| 5,963,416 A * | 10/1999 | Honda et al. ............ | 361/306.1 |
| 6,252,761 B1 * | 6/2001 | Branchevsky ............ | 361/321.2 |
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,054,136 B2 * | 5/2006 | Ritter et al. ............ | 361/309 |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |

(Continued)

FOREIGN PATENT DOCUMENTS

WO    2007/049456 A1    5/2007

OTHER PUBLICATIONS

Sasabayashi, "Multilayer Ceramic Electronic Component", U.S. Appl. No. 12/765,965, filed Apr. 23, 2010.

(Continued)

*Primary Examiner* — Nguyen T Ha
(74) *Attorney, Agent, or Firm* — Keating & Bennett, LLP

(57) ABSTRACT

A multilayer electronic component includes a ceramic body including ceramic layers that are laminated to one another and internal conductors having exposed portions at side surfaces of the ceramic body. Substantially linear connection portions extend in the lamination direction of the ceramic layers so as to connect the exposed portions to one another. External terminal electrodes cover the exposed portions of the internal conductors and the connection portions and include base plating films directly disposed on the side surfaces by plating. The connection portions are formed by polishing the side surfaces in which the internal conductors are exposed using, for example, a brush so as to elongate the exposed portions of the internal conductors.

10 Claims, 13 Drawing Sheets

U.S. PATENT DOCUMENTS

| | | |
|---|---|---|
| 7,177,137 B2 | 2/2007 | Ritter et al. |
| 7,239,500 B2 * | 7/2007 | Togashi et al. ............. 361/306.3 |
| 7,344,981 B2 | 3/2008 | Ritter et al. |
| 7,345,868 B2 | 3/2008 | Trinh |
| 7,463,474 B2 | 12/2008 | Ritter et al. |
| 7,463,475 B2 * | 12/2008 | Kimura et al. ............. 361/306.1 |
| 7,529,077 B2 * | 5/2009 | Yoshida et al. ............ 361/306.3 |
| 7,535,694 B2 * | 5/2009 | Togashi ..................... 361/306.1 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

OTHER PUBLICATIONS

Kunishi et al., "Laminated Electronic Component and Method for Manufacturing the same", U.S. Appl. No. 12/796,688, filed Jun. 9, 2010.

Kunishi et al.: "Laminated Electronic Component and Method for Manufacturing the Same"; U.S. Appl. No. 12/030,360; filed Feb. 13, 2008.

Kunishi et al.: "Laminated Electronic Component and Method for Manufacturing the Same"; U.S. Appl. No. 12/030,282; filed Feb. 13, 2008.

Ito: "Laminated Ceramic Electronic Component"; U.S. Appl. No. 12/489,631; filed Jun. 23, 2009.

* cited by examiner

MULTILAYER ELECTRONIC COMPONENT AND METHOD FOR MANUFACTURING THE SAME

BACKGROUND OF THE INVENTION

1. Field of the Invention

The present invention relates to multilayer electronic components and methods for producing multilayer electronic components, and particularly, to a multilayer electronic component in which external terminal electrodes that are connected to internal conductors are directly formed on surfaces of a ceramic body by plating and a method for producing the multilayer electronic component.

2. Description of the Related Art

Recently, the market for compact portable electronic devices has been expanding, including cellular phones, notebook PCs, digital cameras, and digital audio equipment. Such portable electronic devices are becoming smaller while having higher capabilities. Accordingly, smaller sizes and higher capabilities have also been demanded for numerous multilayer ceramic electronic components mounted on the portable electronic devices. For example, there has been a demand for monolithic ceramic capacitors having smaller sizes and higher capacitances.

One effective approach to provide monolithic ceramic capacitors having smaller sizes and higher capacitances is to reduce the thickness of ceramic layers. Recently, capacitors including ceramic layers having a thickness of about 3 μm or less have been produced. Although a further reduction in the thickness of the ceramic layers has been attempted, it has been difficult to ensure quality because a reduced layer thickness increases the risk of a short circuit between internal electrodes.

Another approach is to increase the effective area of the internal electrodes. However, mass production of monolithic ceramic capacitors requires side margins between the internal electrodes and side surfaces of a ceramic body and end margins between the internal electrodes and end surfaces of the ceramic body to allow for misalignment during lamination and cutting of ceramic green sheets. Therefore, to increase the effective area of the internal electrodes, the area of the ceramic layers must be increased to accommodate predetermined margins. However, there is a limitation on increasing the area of the ceramic layers within predetermined dimensional specifications of the products, and the thickness of external terminal electrodes is a hindrance to increasing the area of the ceramic layers.

Typically, external terminal electrodes of monolithic ceramic capacitors are formed by applying a conductive paste to the ends of a ceramic body and firing the paste. A common method for applying the conductive paste is to dip the ends of the ceramic body into a paste bath and to remove the ends therefrom. However, in this method, the conductive paste tends to be thickly applied at the central portions of the end surfaces of the ceramic body due to the viscosity of the conductive paste. Thus, the external terminal electrodes are partially thick (specifically, more than about 30 μm thick), and the area of the ceramic layers must be decreased accordingly.

In response to this problem, a method in which external terminal electrodes are directly formed by plating has been proposed.

In this method, plating films precipitate on exposed portions of internal electrodes at end surfaces of a ceramic body, and as the plating films grow, the exposed portions of the adjacent internal electrodes are connected together. This method enables the formation of thinner and flatter electrode films than the method using a conductive paste (see International Publication No. WO 2007/049456).

However, if the external terminal electrodes are directly formed on the surfaces of the ceramic body by plating, the following problem occurs.

If the external terminal electrodes are directly formed by plating, plating growth proceeds in two stages: a primary growth stage in which plating films grow from the exposed portions of the individual internal electrodes primarily in a spreading direction, and a secondary growth stage in which the plating films grown at the primary growth stage combine together in the spreading direction and a plating film grows from the continuous plating film primarily in a thickness direction. However, a problem arises in that it takes a significant amount of time for the separate plating films to grow and combine together in the spreading direction at the primary growth stage because the exposed portions of the internal electrodes are independent and isolated from each other. This increases the time required to form a plating film with a predetermined thickness, thus causing low productivity.

SUMMARY OF THE INVENTION

To overcome the problems described above, preferred embodiments of the present invention provide a multilayer ceramic electronic component and a method for producing a multilayer ceramic electronic component that enables efficient plating growth when external terminal electrodes are directly formed on surfaces of a ceramic body by plating, thus providing high productivity.

According to a preferred embodiment of the present invention, a multilayer electronic component is provided which includes a ceramic body including a plurality of ceramic layers laminated on top of each other and having a first main surface and a second main surface that are opposed to each other and a plurality of side surfaces connecting the first and second main surfaces, internal conductors disposed in the ceramic body and having exposed portions that are disposed at at least one of the side surfaces and that are arranged in the side surface so as to be adjacent to each other in a lamination direction of the ceramic layers, a connection portion that is disposed on the side surface of the ceramic body, that extends from the internal conductors in the lamination direction of the ceramic layers so as to connect together at least one pair of the adjacent exposed portions, and that is disposed in a recess formed by partially removing the side surface, and external terminal electrodes that are disposed on at least one of the side surfaces, that cover the exposed portions of the internal conductors and the connection portion, and that each include a base plating film directly formed on the side surface by plating.

In the multilayer electronic component, the exposed portions of the internal conductors are preferably arranged in the side surface of the ceramic body so as to be adjacent to each other in the lamination direction of the ceramic layers, and the connection portion extends from the internal conductors so as to connect at least one pair of the adjacent exposed portions. When the external terminal electrodes are directly formed by plating, the exposed portions of the internal conductors and the connection portion function as nuclei for plating growth, thus increasing the area of the nuclei which promotes plating growth. This promotes plating growth in a spreading direction, which enables formation of a sufficiently thick base plating film in a relatively short period of time. Thus, the external terminal electrodes, including the base plating films directly formed by plating, can be efficiently formed, so that a multilayer electronic component can be provided with high productivity.

In the multilayer electronic component, preferably, each pair of the adjacent exposed portions of the internal conductors exposed at the side surface is connected together by the connection portion.

If each pair of the adjacent exposed portions of the internal conductors exposed at the side surface is connected together by the connection portion, the area of the nuclei can be increased to form the external terminal electrodes more efficiently, so that a multilayer electronic component can be provided with high productivity.

Preferably, the internal conductors include effective internal conductors that contribute to the electrical characteristics and dummy internal conductors that do not substantially contribute to the electrical characteristics.

If the internal conductors include the effective internal conductors that contribute to the electrical characteristics and the dummy internal conductors that do not substantially contribute to the electrical characteristics, misalignment in the lamination of the ceramic layers and the internal conductors is less likely to occur in the production process, so that a multilayer electronic component having superior characteristics can be provided.

Preferably, the exposed portions of the effective internal conductors and the exposed portions of the dummy internal conductors are alternately arranged on the side surface in the lamination direction of the ceramic layers.

If the exposed portions of the effective internal conductors and the exposed portions of the dummy internal conductors are alternately arranged on the side surface in the lamination direction of the ceramic layers, the intervals between the exposed portions, which function as nuclei for plating growth, can be reduced to further promote plating growth. In addition, misalignment in the lamination of the ceramic layers and the internal conductors is even less likely to occur in the production process, so that a multilayer electronic component having even more superior characteristics can be provided.

Preferably, the plurality of side surfaces include a first side surface and a second side surface that are opposite each other and a third side surface and a fourth side surface that are opposite each other, and the exposed portions of the internal conductors are arranged so as to be exposed at the first and third side surfaces.

If the plurality of side surfaces include the first side surface and the second side surface that are opposite each other and the third side surface and the fourth side surface that are opposite each other and the exposed portions of the internal conductors are arranged so as to be exposed at the first and third side surfaces, a multilayer electronic component, such as a typical chip monolithic ceramic capacitor, having external terminal electrodes disposed at both ends thereof and electrically connected to different internal conductors can be provided.

The exposed portions of the internal conductors can also be continuously exposed at the first and third side surfaces.

The exposed portions of the internal conductors can also be arranged so as to be exposed at the first, third, and fourth side surfaces.

The exposed portions of the internal conductors can also be continuously exposed at the first, third, and fourth side surfaces.

In the above-described arrangements, the external terminal electrodes, including the base plating films, can be efficiently formed on a plurality of surfaces, so that a multilayer electronic component having high reliability can be provided.

The adjacent exposed portions of the internal conductors can be arranged in columns in the lamination direction of the ceramic layers, and the individual columns of the exposed portions can be covered by the external terminal electrodes.

If the adjacent exposed portions of the internal conductors are arranged in columns in the lamination direction of the ceramic layers and the individual columns of the exposed portions are covered by the external terminal electrodes, the external terminal electrodes can be efficiently formed by plating, so that a multilayer electronic component can be provided with high productivity.

According to a preferred embodiment of the present invention, a method for producing a multilayer electronic component, which includes a ceramic body including a plurality of ceramic layers laminated on top of each other, internal conductors disposed in the ceramic body and having exposed portions in a predetermined side surface of the ceramic body, and external terminal electrodes disposed on the side surface of the ceramic body, electrically connected to the internal conductors, and covering the exposed portions of the internal conductors, includes the steps of forming the ceramic body so that the exposed portions of the internal conductors are arranged so as to be adjacent to each other in a lamination direction of the ceramic layers, forming a connection portion connecting at least one pair of the adjacent exposed portions on the side surface in which the internal conductors are exposed by polishing the side surface so as to elongate the exposed portions of the internal conductors, and forming the external terminal electrodes on the ceramic body by directly forming a base plating film on the side surface of the ceramic body by plating so as to cover the exposed portions of the internal conductors and the connection portion.

In the method for producing a multilayer electronic component, the ceramic body is preferably formed so that the exposed portions of the internal conductors exposed at the predetermined side surface of the ceramic body are arranged so as to be adjacent to each other in the lamination direction of the ceramic layers, and the connection portion connecting the at least one pair of the adjacent exposed portions is formed on the side surface in which the internal conductors are exposed by polishing the side surface so as to elongate the exposed portions of the internal conductors. Therefore, the exposed portions of the internal conductors are joined together, and the area of the portions functioning as nuclei for plating growth is increased accordingly. This promotes plating growth in a spreading direction, thus enabling the formation of a sufficiently thick base plating film in a relatively short period of time. Thus, a multilayer electronic component having external terminal electrodes including base plating films directly formed by plating can be efficiently produced.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described with reference to the drawings.

First Preferred Embodiment

Figure 1:
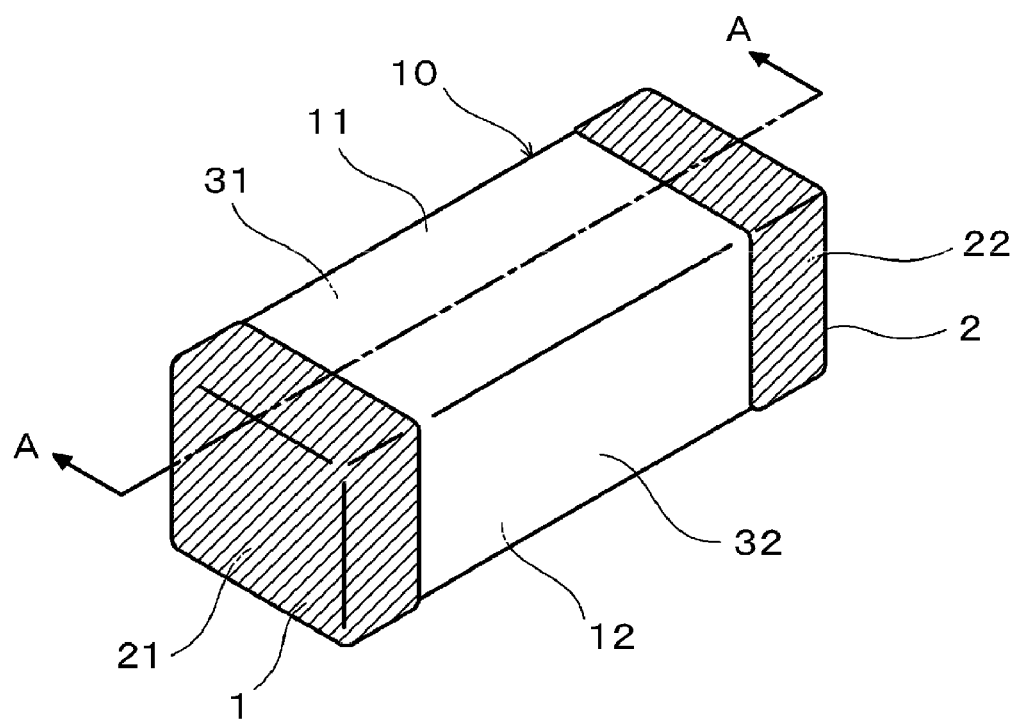
FIG. 1 is a perspective view showing a multilayer electronic component according to a first preferred embodiment of the present invention.
Figure 2:
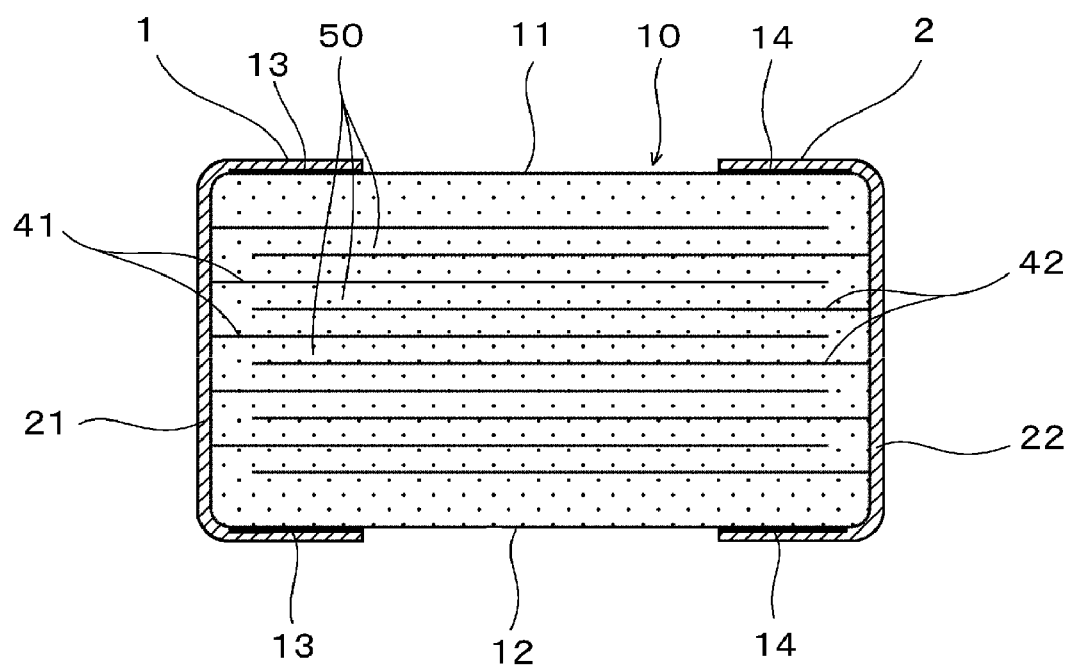
FIG. 2 is a sectional view of FIG. 1 taken along line A-A.
Figure 3:
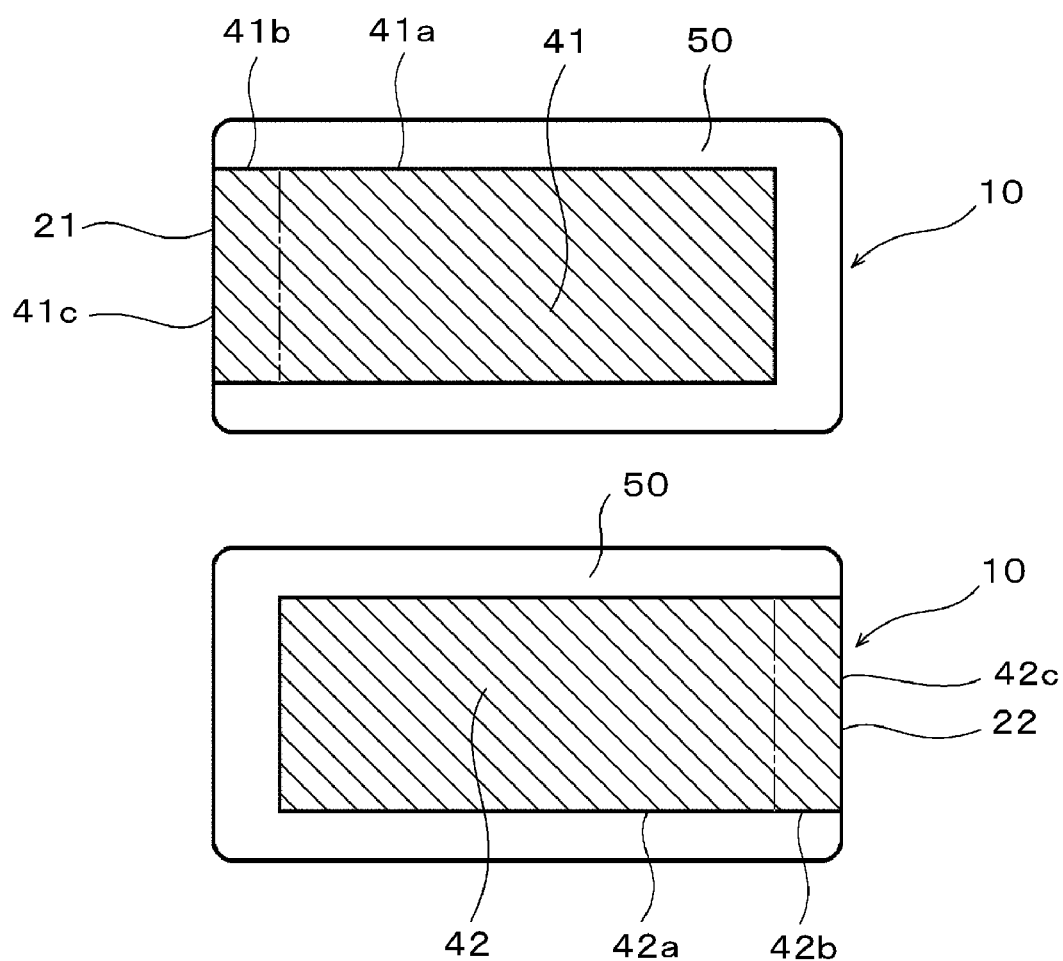
FIG. 3 is a diagram illustrating internal conductor patterns of the multilayer electronic component according to the first preferred embodiment of the present invention.
Figure 4:
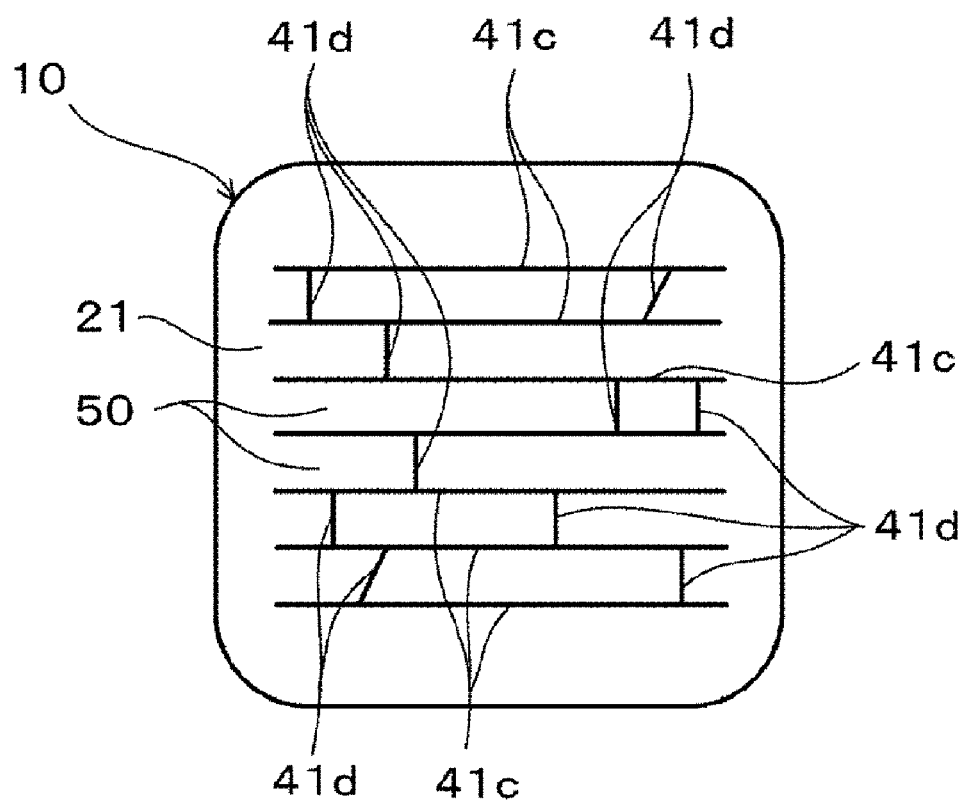
FIG. 4 is a diagram showing a pattern of exposed portions of the internal conductors and connection portions connecting together the internal conductors in a side surface of the multilayer electronic component according to the first preferred embodiment of the present invention.
Figure 5:
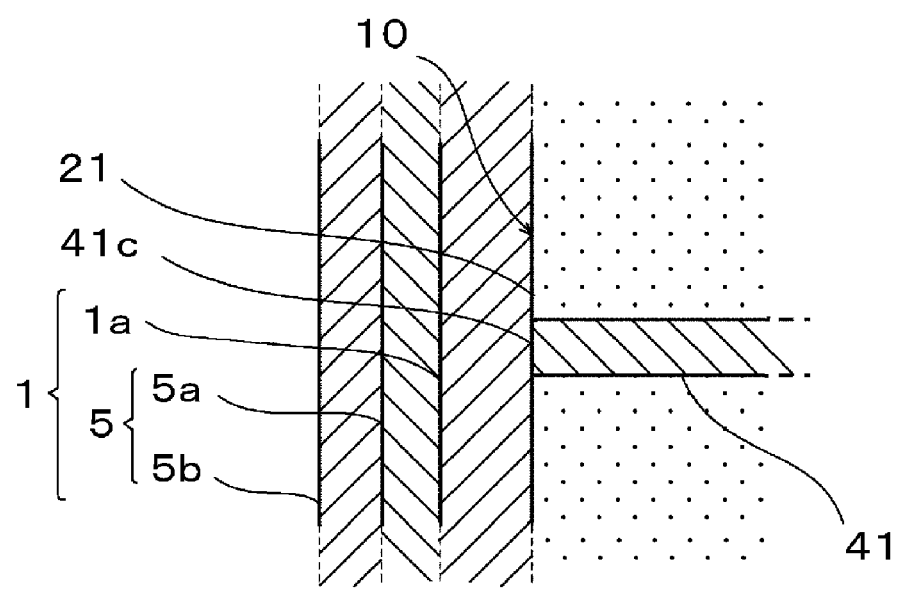
FIG. 5 shows an exploded view of a portion of the multilayer electronic component according to the first preferred embodiment of the present invention.

FIG. 1 is a perspective view of a multilayer electronic component according to a first preferred embodiment of the present invention. FIG. 2 is a sectional view of FIG. 1 taken along line A-A. FIG. 3 is a set of exploded plan views of FIG. 1. FIG. 4 is a schematic diagram showing a first side surface of the multilayer electronic component (ceramic body) before external terminal electrodes are provided thereon. FIG. 5 is a partial enlarged view of FIG. 2, showing the film structure of a first external terminal electrode.

Referring to FIGS. 1 and 2, the multilayer electronic component includes a substantially rectangular ceramic body 10 with a first main surface 11 and a second main surface 12 that are opposite to each other and a first side surface 21, a second side surface 22, a third side surface 31, and a fourth side surface 32 that connect the main surfaces 11 and 12. The ceramic body 10 includes a plurality of ceramic layers 50 laminated on top of each other.

The first side surface 21 and the second side surface 22 are opposite to each other, whereas the third side surface 31 and the fourth side surface 32 are opposite to each other.

A first external terminal electrode 1 is disposed on the first side surface 21, and a second external terminal electrode 2 is disposed on the second side surface 22. The first external terminal electrode 1 is electrically isolated from the second external terminal electrode 2.

First surface conductors 13 and second surface conductors 14 are provided on the first main surface 11 and the second main surface 12. The first surface conductors 13 support portions of the first external terminal electrode 1 that extend onto the first main surface 11, and the second surface conductors 14 support portions of the second external terminal electrode 2 that extend onto the second main surface 12. The first surface conductors 13 and the second surface conductors 14 may also be provided on the first side surface 21 and the second side surface 22. The first surface conductors 13 and the second surface conductors 14 are not required if the portions of the first external terminal electrode 1 and the second external terminal electrode 2 are not required to extend onto the first main surface 11 and the second main surface 12.

The ceramic body 10 includes first effective internal conductors 41 and second effective internal conductors 42. The first effective internal conductors 41 extend to the first side surface 21 and are electrically connected to the first external terminal electrode 1. The second effective internal conductors 42 extend to the second side surface 22 and are electrically connected to the second external terminal electrode 2.

Referring to FIG. 3, the first effective internal conductors 41 include a first effective portion 41a and a first extending portion 41b extending from the first effective portion 41a to the first side surface 21. The second effective internal conductors 42 include a second effective portion 42a and a second extending portion 42b extending from the second effective portion 42a to the second side surface 22. Desired electrical characteristics are obtained between opposing portions of the first effective portions 41a and the second effective portions 42a with the ceramic layers 50 held therebetween.

Referring to FIG. 4, the individual first effective internal conductors 41 include exposed portions 41c arranged in the first side surface 21 so as to be adjacent to each other in the lamination direction of the ceramic layers 50. Substantially linear minute connection portions 41d extend across the first side surface 21 in the lamination direction of the ceramic layers 50 so as to connect adjacent exposed portions 41c of the first effective internal conductors 41 to one another. Similarly, although not shown, substantially linear connection portions extend across the second side surface 22 so as to connect adjacent exposed portions 42c of the second effective internal conductors 42 to one another.

Referring to FIG. 5, the first external terminal electrode 1 preferably includes a base plating film 1a and an overlying plating film 5. The base plating film 1a is preferably directly formed on the first side surface 21 by plating so as to cover the exposed portions 41c of the individual first effective internal conductors 41 and the connection portions 41d (not shown in FIG. 5).

The overlying plating film 5 preferably includes a first overlying plating film 5a arranged so as to cover the base plating film 1a and a second overlying plating film 5b arranged so as to cover the first overlying plating film 5a. Although not shown, the second external terminal electrode 2 preferably has a similar film structure.

Thus, because the connection portions connect the exposed portions of the internal conductors to one another, the exposed portions, which function as nuclei for plating growth, are joined together, and the area of the exposed portions is increased accordingly. This increases the growth rate of a plating film in a spreading direction, which enables the formation of a sufficiently thick base plating film in a relatively short period of time. In particular, if the base plating film is formed by electrolytic plating, the plating growth is further facilitated because of an increased contact area with conductive media, such as steel balls.

Preferably, at least half of the pairs of adjacent exposed portions of the internal conductors are connected to one another by the connection portions. More preferably, each pair of adjacent exposed portions is connected to one another by the connection portions. This enables more exposed portions to be connected to one another, thus further increasing the area of the portions functioning as nuclei for plating growth. The connection portions are not necessarily required to extend in a straight line parallel or substantially parallel to the lamination direction of the ceramic layers, and instead, may be inclined with respect to the lamination direction.

The connection portions, extending from the internal conductors, are preferably relatively thin in the dimension from the first side surface 21 to the side surface 22, for example, about 0.1 μm to about 1.0 μm thick. In addition, the connection portions are disposed in recesses formed by partially removing the side surface of the ceramic body. Thus, the connection portions do not prevent a reduction in the thickness of the external terminal electrodes.

The metal defining the connection portions and the ceramic defining the ceramic body are not chemically combined but are merely in physical contact. For example, if metal is connected to ceramic by a firing reaction, they may be cracked by a tensile or compressive stress caused by their differences in shrinkage during the firing. Preferred embodiments of the present invention do not suffer from this problem.

Preferably, $t_1/t_2 \leqq 4$ is satisfied, where $t_1$ is the thickness of the ceramic layers, and $t_2$ is the thickness of the internal conductors. If $t_1/t_2 > 4$, it may be difficult to connect the exposed portions of the internal conductors to one another with the connection portions because of the low proportion of the exposed portions at the side surfaces.

The details of the individual elements will be described below.

Ceramic Layers

The ceramic layers can preferably be made of a dielectric ceramic including a main component, such as $BaTiO_3$, $CaTiO_3$, $SrTiO_3$, or $CaZrO_3$, for example, or one including the main component and a minor component, such as a manganese compound, an iron compound, a chromium compound, a cobalt compound, or a nickel compound, for example. Other types of ceramics can also be used, including piezoelectric ceramics such as PZT ceramics and semiconductor ceramics such as spinel ceramics, for example. The multilayer electronic component functions as a capacitor if a dielectric ceramic is used, functions as a piezoelectric component if a piezoelectric ceramic is used, and functions as a thermistor if a semiconductor ceramic is used.

The ceramic layers preferably have a thickness of about 0.1 μm to about 10 μm, for example. If the ceramic layers are formed by firing, the above thickness refers to the thickness after the firing.

Internal Conductors

The material defining the internal conductors can preferably be, for example, nickel, copper, silver, palladium, gold, or an alloy thereof.

The internal conductors preferably have a thickness of about 0.1 μm to about 2.0 μm, for example. If the internal conductors are formed by firing, the above thickness refers to the thickness after the firing.

Connection Portions

The connection portions can preferably be made of substantially the same composition as the internal conductors.

The width of the connection portions may preferably be similar to the thickness of the internal conductors, that is, the thickness of the exposed portions, although in some cases it may be greater than or less than the thickness of the exposed portions. The width of the connection portions is preferably less than the thickness of the exposed portions and is preferably about 0.5 μm to about 5 μm, for example.

External Terminal Electrodes

The base plating film and the overlying plating films are preferably made of, for example, a plating of a metal selected from the group consisting of copper, nickel, tin, lead, gold, silver, palladium, bismuth, and zinc or an alloy containing the metal.

For example, if the internal conductors are made of nickel, the base plating film is preferably made of copper because it has good adhesion to nickel. The second overlying plating film is preferably made of tin or gold, for example, because they have good solder wettability, and the first overlying plating film is preferably made of nickel, for example, because it has solder barrier properties.

The overlying plating films are provided as required and the external terminal electrodes may be made of only the base plating film.

Each plating film preferably has a thickness of about 1 μm to about 15 μm, for example.

Next, an example of a method for producing the above multilayer electronic component will be described.

Ceramic green sheets and a conductive paste for internal conductors are prepared. The ceramic green sheets and the conductive paste preferably include, for example, a binder or a solvent, and a known organic binder or solvent can be used therefor.

Predetermined patterns are printed on the ceramic green sheets with the conductive paste by, for example, screen printing to form internal conductor patterns.

A predetermined number of ceramic green sheets with the internal conductor patterns printed thereon are laminated on top of each other, and a predetermined number of ceramic green sheets for outer layers with no internal conductor pattern printed thereon are laminated on the top and bottom of the laminate. Thus, a green mother laminate is prepared. The mother laminate is pressed in the lamination direction by, for example, isostatic pressing as required. There is no particular limitation on, for example, the specific order of lamination of the ceramic green sheets.

The green mother laminate is cut to a predetermined size to prepare a green chip.

The green chip is fired. The firing temperature is preferably about 900° C. to about 1,300° C., for example, depending on the materials of the ceramic green sheets and the conductive paste defining internal conductors.

The side surfaces of the fired chip (ceramic body) at which the internal conductors are exposed are polished by a method, such as brushing. For example, a copper wire brush can be used for brushing. As a result, the exposed portions of the internal conductors in the side surfaces of the ceramic body are brushed and elongated, to thereby form connection portions connecting the exposed portions of the internal conductors to one another.

The ridges and corners of the chip are preferably rounded as required by a method, such as barrel polishing, for example.

The chip is plated to form base plating films on the exposed portions of the internal conductors. The chip may be plated either by electrolytic plating or by electroless plating, although electroless plating has a disadvantage of complicating the process because it requires pretreatment using, for example, a catalyst to increase plating speed. Therefore, electrolytic plating is usually preferred. The plating method used is preferably barrel plating, for example.

If the first surface conductors 13 and the second surface conductors 14 (see FIG. 2) are formed, surface conductor patterns may be printed on the ceramic green sheets defining outermost layers in advance before being fired together with the ceramic body, or may be printed on the main surfaces of the fired ceramic body before being fired.

At least one overlying plating film is preferably formed on the base plating film as required.

Thus, a multilayer electronic component having the structure shown in FIGS. 1 to 4 is produced.

Second Preferred Embodiment

Figure 6:
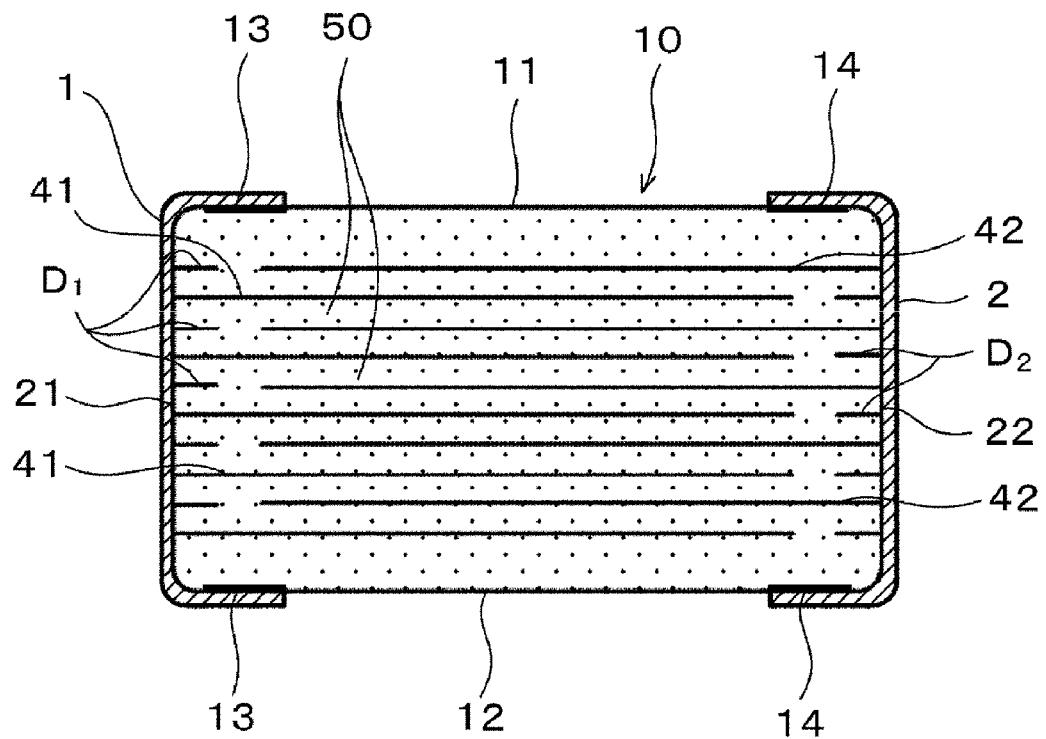
FIG. 6 is a sectional view of a multilayer electronic component according to a second preferred embodiment of the present invention.

FIG. 6 is a diagram of a multilayer electronic component according to a second preferred embodiment of the present invention. The multilayer electronic component according to the second preferred embodiment preferably has substantially the same structure as the multilayer electronic component according to the first preferred embodiment, except that the ceramic body 10 further includes first dummy internal conductors $D_1$ having exposed portions at the first side surface 21 and second dummy internal conductors $D_2$ having exposed portions at the second side surface 22. In FIG. 6, the same reference numerals as those used in FIGS. 2 and 4 denote the same or corresponding elements.

The first dummy internal conductors $D_1$ and the second dummy internal conductors $D_2$ are electrodes that do not significantly contribute to the electrical characteristics.

The first dummy internal conductors $D_1$ are preferably arranged in the same plane as the second effective internal conductors 42. The second dummy internal conductors $D_2$ are preferably arranged in the same plane as the first effective internal conductors 41.

Figure 7:
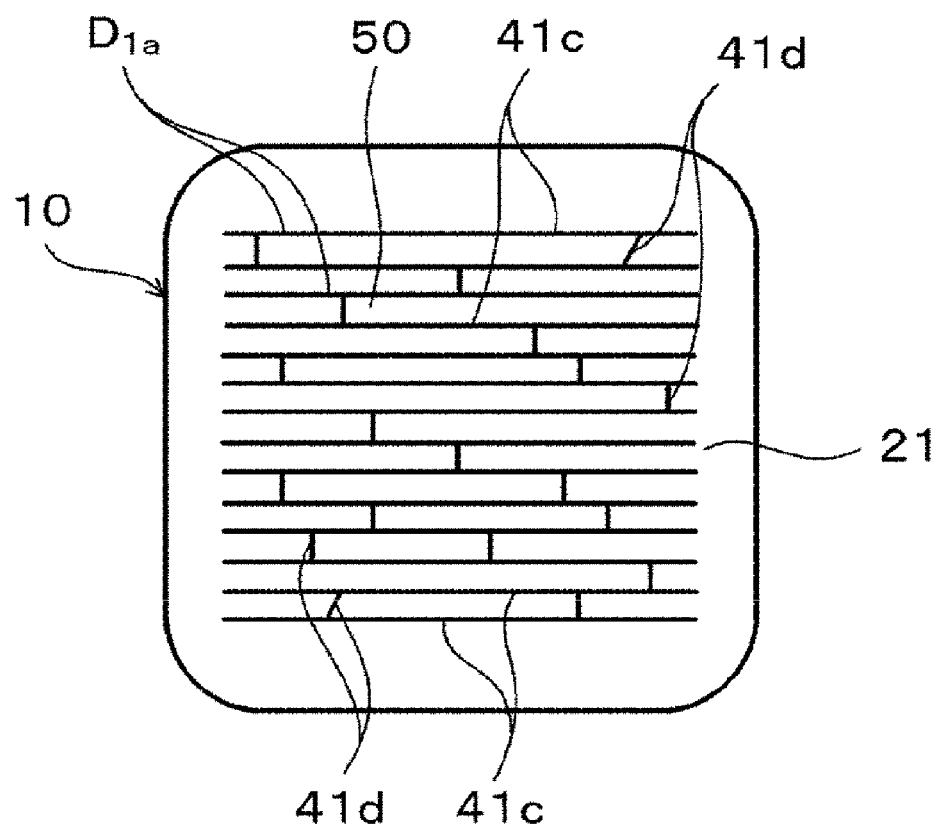
FIG. 7 is a diagram showing a pattern of exposed portions of internal conductors and connection portions connecting together the internal conductors in a side surface of the multilayer electronic component according to the second preferred embodiment of the present invention.

Referring to FIG. 7, the exposed portions 41c of the first effective internal conductors 41 (see FIG. 6) and exposed portions $D_{1a}$ of the first dummy internal conductors $D_1$ are alternately arranged in the first side surface 21 in the lamination direction of the ceramic layers 50. The connection portions 41d extend between one or more pairs of adjacent exposed portions 41c and $D_{1a}$ of the first effective internal conductors 41 and the first dummy internal conductors $D_1$ so as to connect the exposed portions 41c and $D_{1a}$ to one another in the lamination direction of the ceramic layers 50. Although not shown, a similar structure is provided in the second side surface 22.

Thus, the dummy internal conductors reduce the intervals between the exposed portions of the internal conductors in the side surfaces, so that the connection portions can be more easily provided.

The dummy internal conductors preferably have substantially the same thickness as the effective internal conductors. The relationship between the thickness of the effective internal conductors and the dummy internal conductors and the thickness of the ceramic layers preferably satisfies $t_1/t_2 \leqq 4$, where $t_1$ is the thickness of the ceramic layers, and $t_2$ is the thickness of the effective internal conductors and the dummy internal conductors. If $t_1/t_2 > 4$, it may be difficult to connect the exposed portions of the internal conductors to one another with the connection portions because of the low proportion of the exposed portions at the side surfaces.

Third Preferred Embodiment

Figure 8:
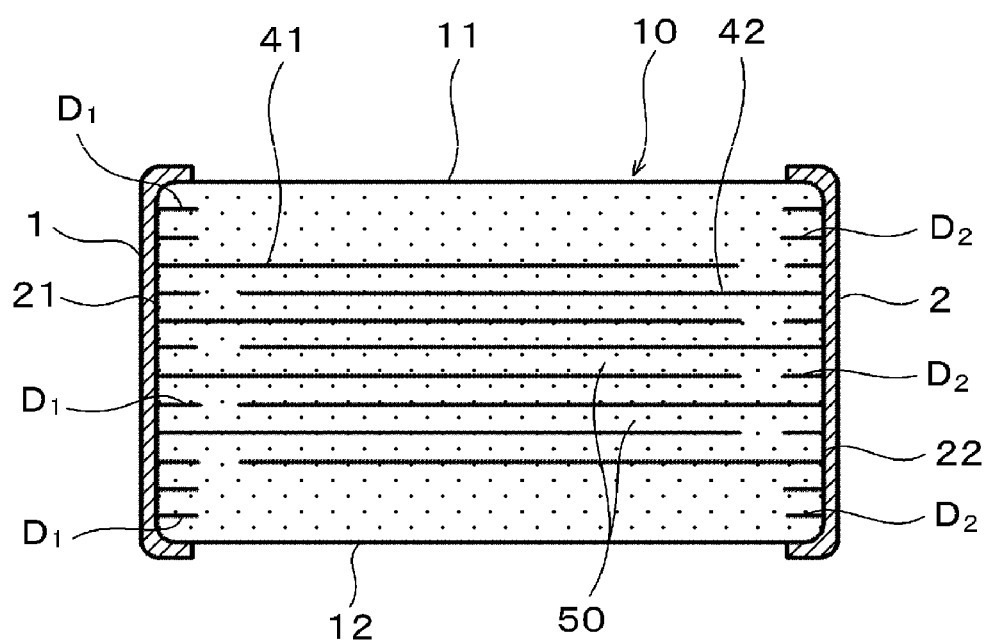
FIG. 8 is a sectional view of a multilayer electronic component according to a third preferred embodiment of the present invention.

FIG. 8 is a diagram of a multilayer electronic component according to a third preferred embodiment of the present invention. In the multilayer electronic component according to the third preferred embodiment, the first dummy internal conductors $D_1$ and the second dummy internal conductors $D_2$ are also disposed in outer portions that do not include first or second effective internal conductors. In the outer portions, the first dummy internal conductors $D_1$ are preferably arranged in the same plane as the second dummy internal conductors $D_2$. In FIG. 8, the same reference numerals as in FIG. 2 denote the same or corresponding elements.

In the structure according to the third preferred embodiment, the dummy internal conductors reduce the intervals between the exposed portions of the internal conductors in the side surfaces, so that the connection portions can be more easily provided.

Fourth Preferred Embodiment

Figure 9:
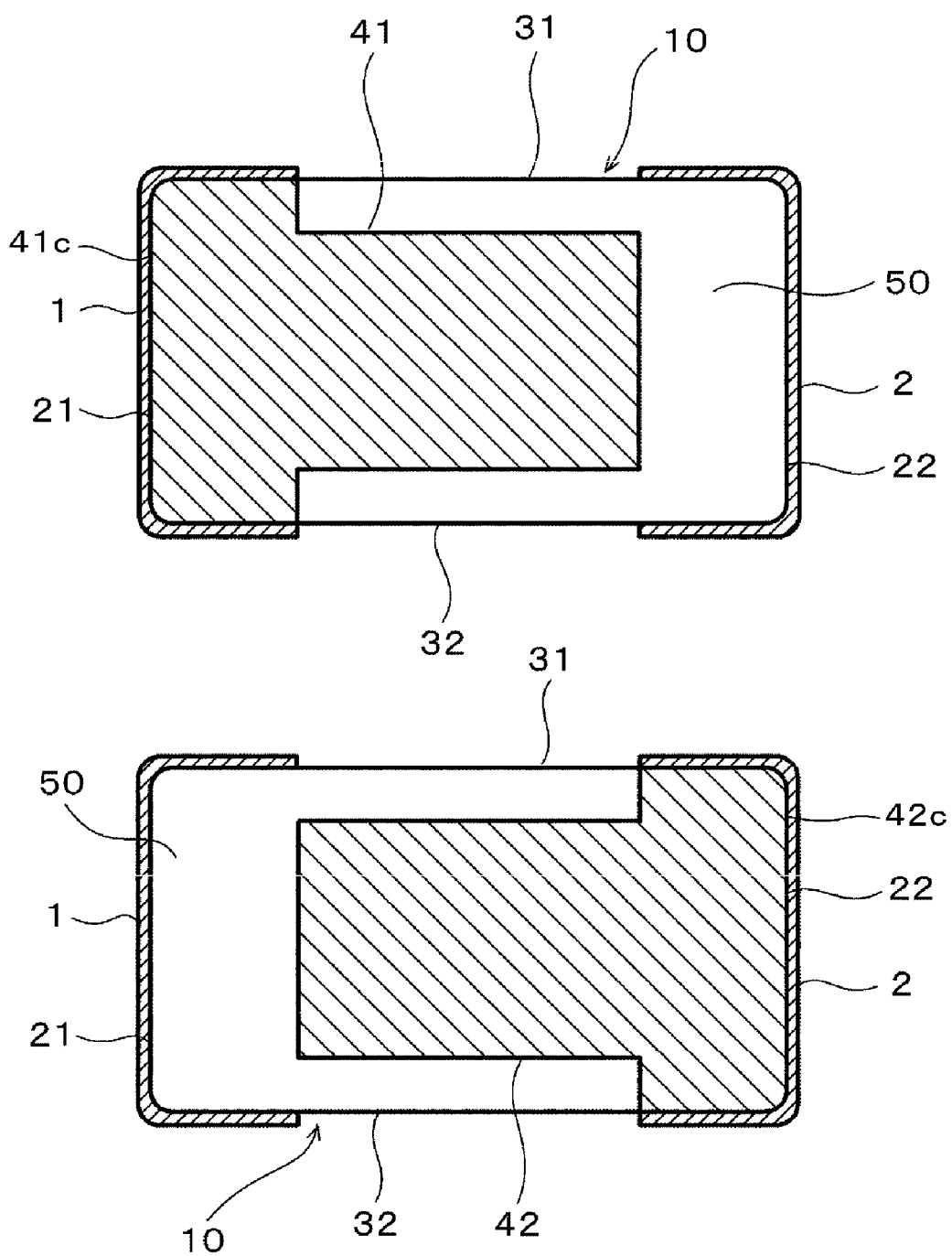
FIG. 9 is a diagram of sectional views of a multilayer electronic component according to a fourth preferred embodiment of the present invention.

FIG. 9 is a set of diagrams of a multilayer electronic component according to a fourth preferred embodiment of the present invention. In the multilayer electronic component according to the fourth preferred embodiment, the first effective internal conductors 41 are substantially T-shaped, with the exposed portions 41c thereof arranged so as to be exposed at the first side surface 21, the third side surface 31, and the fourth side surface 32. The exposed portions 41c of the first effective internal conductors 41 are continuously exposed at the first side surface 21, the third side surface 31, and the fourth side surface 32.

Similarly, the second effective internal conductors 42 are substantially T-shaped, with the exposed portions 42c thereof arranged so as to be exposed at the second side surface 22, the third side surface 31, and the fourth side surface 32. The exposed portions 42c of the second effective internal conductors 42 are continuously exposed at the second side surface 22, the third side surface 31, and the fourth side surface 32.

The connection portions connecting the adjacent exposed portions of the internal conductors to one another may be provided not only in the first side surface and the second side surface, but also in the third side surface and the fourth side surface.

In the multilayer electronic component according to this preferred embodiment, the effective internal conductors are preferably arranged perpendicular or substantially perpendicular to a mounting substrate. In other words, the multilayer electronic component is mounted on a mounting substrate with the fourth side surface as a mounting surface.

Fifth Preferred Embodiment

Figure 10:
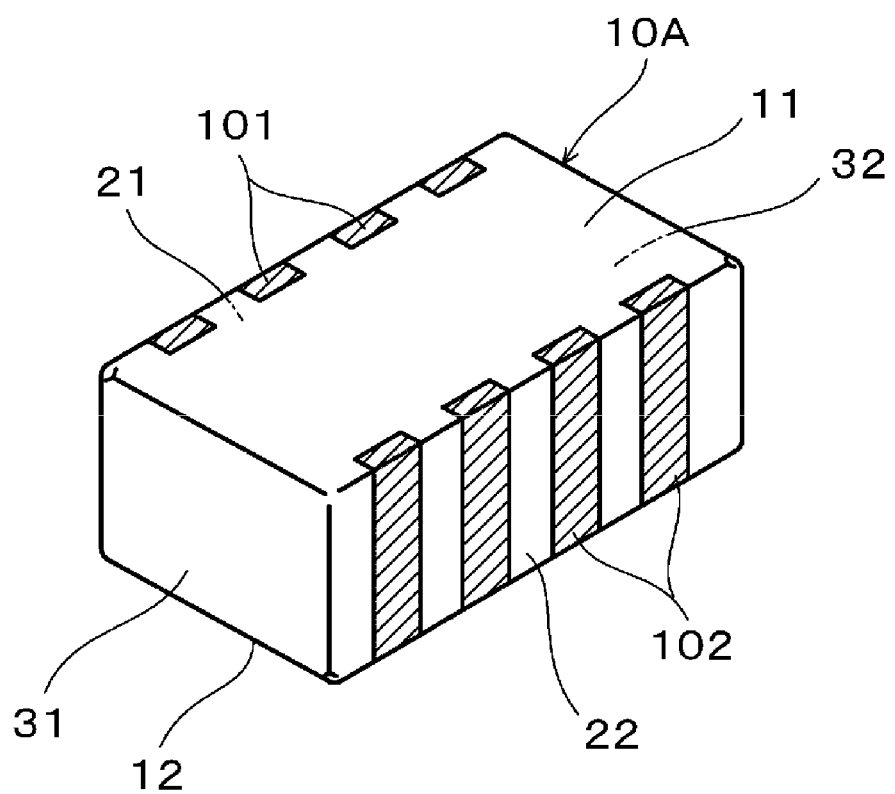
FIG. 10 is a perspective view showing an array monolithic ceramic capacitor (capacitor array) according to a fifth preferred embodiment of the present invention.
Figure 11:
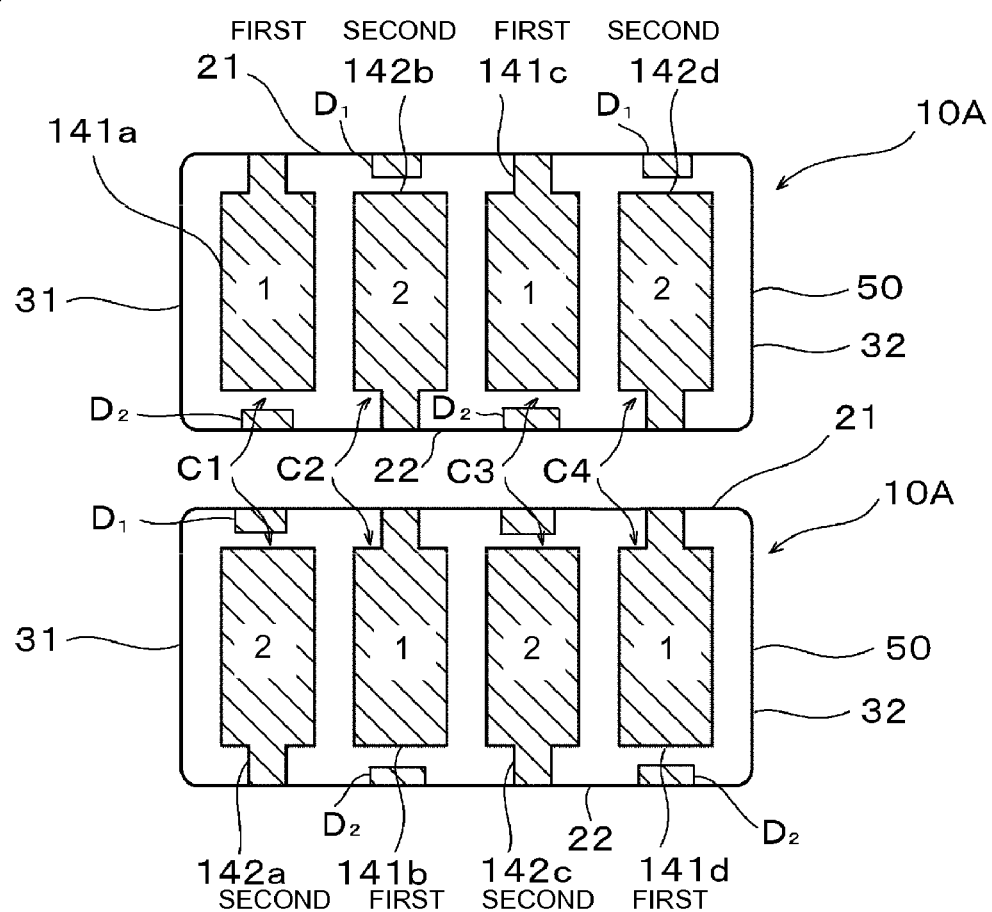
FIG. 11 is a diagram illustrating an arrangement pattern of internal conductors in the array monolithic ceramic capacitor according to the fifth preferred embodiment of the present invention.

FIG. 10 is a perspective view of an array multilayer electronic component (capacitor array) according to a fifth preferred embodiment of the present invention. FIG. 11 is a set of diagrams illustrating an arrangement pattern of internal conductors. The array multilayer electronic component according to the fifth preferred embodiment includes a substantially rectangular capacitor array body 10A with a first main surface 11 and a second main surface 12 that are opposite to each other, a first side surface 21 and a second side surface 22 that are opposite to each other, and a third side surface 31 and a fourth side surface 32 that are opposite to each other.

A plurality of first external terminal electrodes 101 are provided on the first side surface 21 of the capacitor array body 10A, and a plurality of second external terminal electrodes 102 are provided on the second side surface 22. The first external terminal electrodes 101 are electrically isolated from the second external terminal electrodes 102.

Referring to FIG. 11, the capacitor array body 10A includes a plurality of first effective internal conductors 141a, 141b, 141c, and 141d and a plurality of second effective internal conductors 142a, 142b, 142c, and 142d arranged to be opposed to each other with the ceramic layers (dielectric layers) 50 therebetween. That is, in the same planes, the first effective internal conductors 141a, 141b, 141c, and 141d and the second effective internal conductors 142a, 142b, 142c, and 142d are alternately arranged in the longitudinal direction of the capacitor array body 10A. In the lamination direction, the first effective internal conductors 141a, 141b, 141c, and 141d and the second effective internal conductors 142a, 142b, 142c, and 142d are arranged to be opposed to each other with the ceramic layers 50 therebetween. As shown in FIG. 11, the individual first effective internal conductors 141a, 141b, 141c, and 141d extend to the first side surface 21 and are electrically connected to the first external terminal electrodes 101 (see FIG. 10), and the individual second effective internal conductors 142a, 142b, 142c, and 142d extend to the second side surface 22 and are electrically connected to the second external terminal electrodes 102 (see FIG. 10).

In addition, the first dummy internal conductors $D_1$ are provided on the sides of the second effective internal conductors 142a, 142b, 142c, and 142d facing away from the second side surface 22, whereas the second dummy internal conductors $D_2$ are provided on the sides of the first effective internal conductors 141a, 141b, 141c, and 141d facing away from the first side surface 21.

In the array monolithic ceramic capacitor according to the fifth preferred embodiment, the first effective internal conductors 141a, 141b, 141c, and 141d and the second effective internal conductors 142a, 142b, 142c, and 142d are arranged opposite to each other with the ceramic layers 50 therebetween to define four capacitor portions C1, C2, C3, and C4 arranged in the longitudinal direction of the capacitor array body 10A.

A multiterminal multilayer electronic component as illustrated in the fifth preferred embodiment requires a longer period of time for direct formation of base plating films by plating than a two-terminal multilayer electronic component as illustrated in the first preferred embodiment because the external terminal electrodes are strip-shaped and the internal conductors have exposed portions with reduced areas. If preferred embodiments of the present invention are applied to this type of multiterminal multilayer electronic component, the external terminal electrodes, including the base plating films, can be efficiently formed by providing connection portions connecting the exposed portions of the effective internal conductors to one another before plating.

Thus, preferred embodiments of the present invention are particularly effective for this type of multiterminal multilayer electronic component.

Sixth Preferred Embodiment

Figure 12:
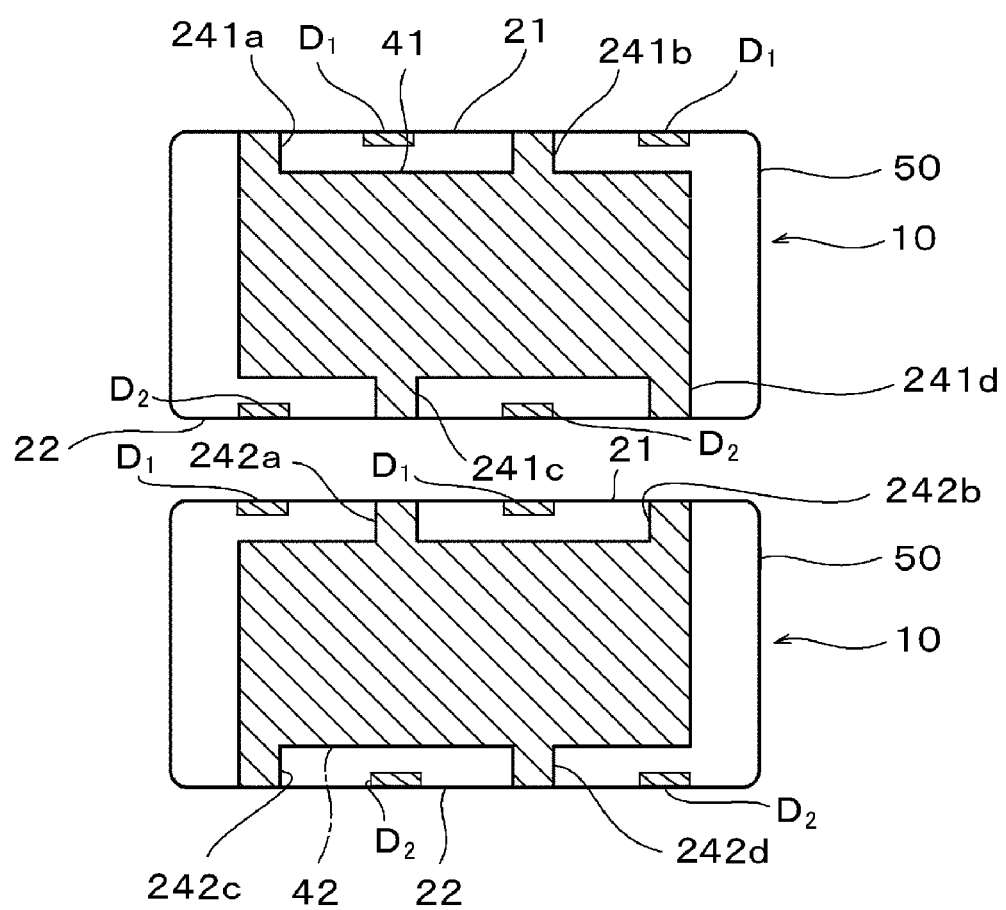
FIG. 12 is a set of diagrams of a multiterminal low-ESL monolithic ceramic capacitor according to a sixth preferred embodiment of the present invention.

FIG. 12 is a set of diagrams showing internal conductor patterns of a multiterminal low-ESL monolithic ceramic capacitor according to a sixth preferred embodiment of the present invention.

In the monolithic ceramic capacitor according to the sixth preferred embodiment, each of the first effective internal conductors 41 includes a plurality of (in the sixth preferred embodiment, four) extending portions 241a, 241b, 241c, and 241d. Similarly, each of the second effective internal conductors 42 includes a plurality of (in the sixth preferred embodiment, four, for example) extending portions 242a, 242b, 242c, and 242d.

In each of the first side surface 21 and the second side surface 22, as shown in FIG. 12, the extending portions 241a, 241b, 241c, and 241d of the first effective internal conductors 41 and the extending portions 242a, 242b, 242c, and 242d of the second effective internal conductors 42 are arranged in a staggered manner, in plan view, such that (a) the extending portions 241b of the first effective internal conductors 41 are arranged between the extending portions 242a and 242b of the second effective internal conductors 42, (b) the extending portions 241c of the first effective internal conductors 41 are arranged between the extending portions 242c and 242d of the second effective internal conductors 42, (c) the extending portions 242a of the second effective internal conductors 42 are arranged between the extending portions 241a and 241b of the first effective internal conductors 41, and (d) the extending portions 242d of the second effective internal conductors 42 are arranged between the extending portions 241c and 241d of the first effective internal conductors 41.

In addition, the dummy internal conductors $D_1$ and $D_2$ are disposed in the planes in which the first effective internal conductors 41 and the second effective internal conductors 42 are disposed so that they are exposed at the first side surface 21 and the second side surface 22, respectively.

In this monolithic ceramic capacitor, the external terminal electrodes are preferably arranged so as to cover the extending portions (exposed portions) of the first and second effective internal conductors and the exposed portions of the dummy internal conductors, which are exposed at the side surfaces of the capacitor body.

The sixth preferred embodiment of the present invention is preferably applied to a multi-terminal multilayer electronic component, base plating films can be efficiently formed by providing connection portions connecting exposed portions of internal conductors to one another before plating. Thus, a multilayer electronic component having external terminal electrodes including base plating films can be efficiently formed.

Seventh Preferred Embodiment

Figure 13:
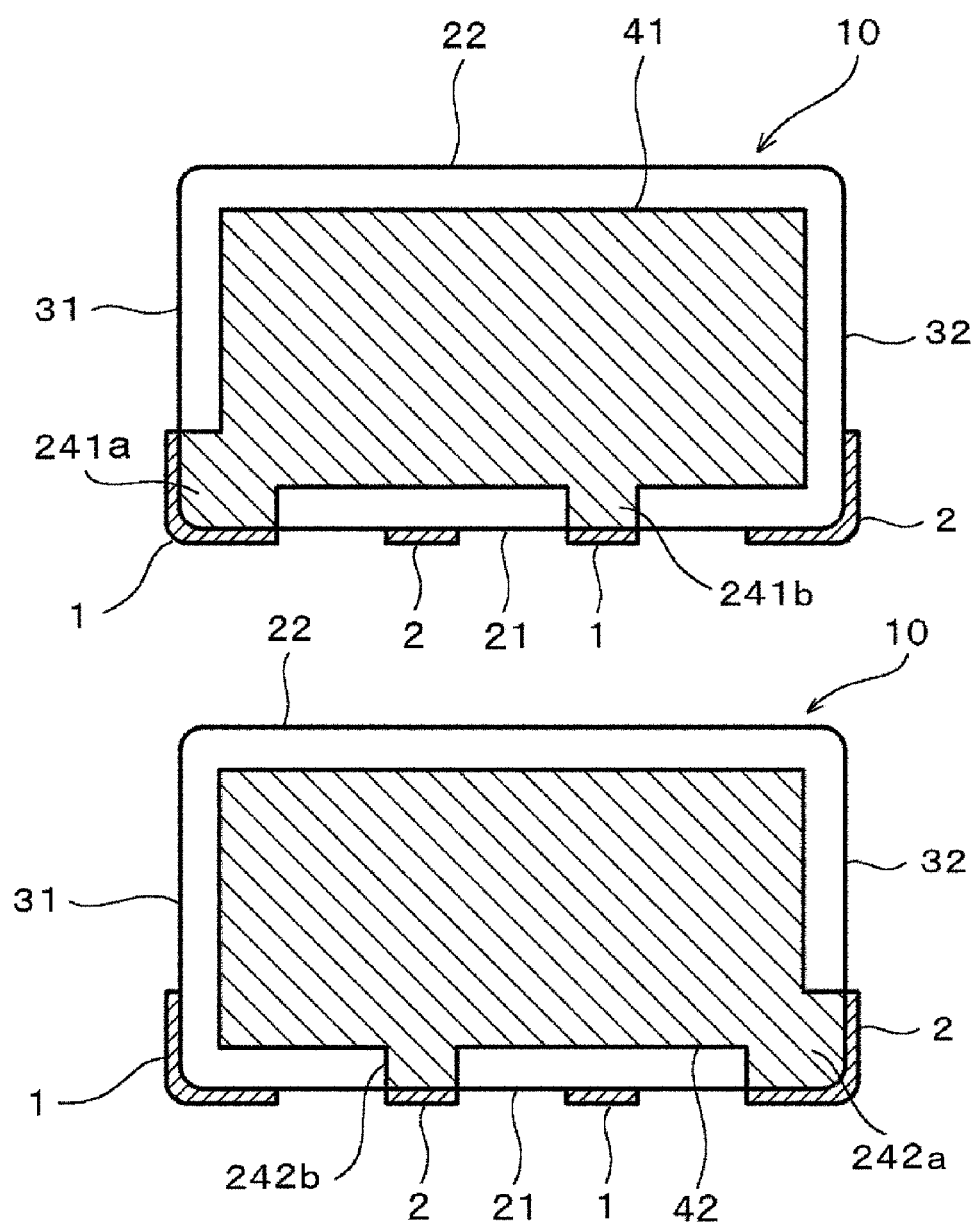
FIG. 13 is a diagram of a multiterminal low-ESL monolithic ceramic capacitor according to a seventh preferred embodiment of the present invention.

FIG. 13 is a set of diagrams showing internal conductor patterns of a multiterminal low-ESL monolithic ceramic capacitor according to a modification of the sixth preferred embodiment.

In the low-ESL monolithic ceramic capacitor, the first external terminal electrodes 1 and the second external terminal electrodes 2 are arranged only around the first side surface 21.

In FIG. 13 (plan view), which shows the structure of the low-ESL monolithic ceramic capacitor according to the seventh preferred embodiment, the side surface facing downward is referred to as the first side surface 21, and the side surface facing upward is referred to as the second side surface 22.

Each of the first effective internal conductors 41 includes two extending portions (exposed portions) 241a and 241b, and the exposed portion 241a is exposed continuously at the first side surface 21 and the third side surface 31.

Similarly, each of the second effective internal conductors 42 includes two exposed portions 242a and 242b, and the exposed portion 242a is exposed continuously at the first side surface 21 and the fourth side surface 32.

In this low-ESL monolithic ceramic capacitor, although not shown, the external terminal electrodes 1 and 2 are preferably arranged so as to cover the exposed portions 241a and 241b of the first effective internal conductors 41 and the exposed portions 242a and 242b of the second effective internal conductors 42, which are exposed at the first, third, and fourth side surfaces 21, 31, and 32 of the capacitor body 10.

If the present invention is applied to a multiterminal multilayer electronic component as illustrated in the seventh preferred embodiment, base plating films can preferably be efficiently formed by providing connection portions connecting together exposed portions of internal conductors before plating. Thus, a multilayer electronic component having external terminal electrodes including base plating films can be efficiently formed.

Experimental Example

A monolithic capacitor array body (ceramic body before formation of base plating films) of the type illustrated in the fifth preferred embodiment was prepared under the following conditions:
(1) Dimensions
  Length (L): about 1.0 mm
  Width (W): about 0.5 mm
  Height (T): about 0.5 mm
(2) Ceramic Layers
  Constituent material: $BaTiO_3$-based dielectric ceramic
  Thickness: about 1.5 μm
  Number of layers: 150 layers
  Number of effective layers: 100 layers
(3) Internal Conductors (Including Dummy Internal Conductors)
  Constituent material: nickel
  Thickness: about 1.0 μm Next, surfaces of the ceramic body in which the internal conductors were exposed were polished by brushing. Observation of the brushed sample by microscopy revealed that connection portions connecting the exposed portions of the internal conductors to one another were formed.

The brushed sample and an unbrushed sample were plated with copper to form base plating films under the following conditions:
  Plating metal: copper
  Plating bath: Pyrobrite (manufactured by C. Uyemura & Co., Ltd.)
  pH: about 8.6
  Temperature: about 55° C.
  Plating method: horizontal rotary barrel plating
  Barrel cycle: about 2.6 m/min
  Steel ball size: about 1.3 mm in diameter
  Current density×time: about 0.3 $A/dm^2$×about 150 min, about 300 min, and about 450 min Next, the samples were examined to determine the relationship between the plating time and the thickness of the base plating films. The results are shown in Table 1. The thickness of the copper plating films was measured using an X-ray fluorescence analyzer (ZSX100e, manufactured by Rigaku Corporation).

TABLE 1

|  |  | Plating time (min) | | |
| --- | --- | --- | --- | --- |
|  |  | 150 | 300 | 450 |
| Thickness of copper plating film (μm) | Invention example | 8.9 | 17.2 | 24.7 |
|  | Comparative example | 2.8 | 6.3 | 10.1 |

The results shown in Table 1 demonstrate that a thicker plating film is formed in the same amount of plating time after brushing is performed to form connection portions connecting exposed portions of internal conductors than without brushing. That is, the results demonstrate that a sufficiently thick base plating film can be formed in a shorter period of time after brushing is performed to form connection portions.

Although monolithic ceramic capacitors have been described as an example in some of the preferred embodiments of the present invention and the experimental example, preferred embodiments of the present invention are not limited to monolithic ceramic capacitors, and may be applied to a wide variety of multilayer electronic components, including multilayer chip inductors and multilayer chip thermistors, that include internal conductors disposed in a ceramic body and external terminal electrodes disposed on surfaces of the ceramic body and electrically connected to the internal conductors.

In addition, although a ceramic body made of a dielectric ceramic has been described as an example in the preferred embodiments of the present invention and the experimental example, the material defining the ceramic body is not limited to a dielectric ceramic, but may also be, for example, a piezoelectric ceramic, a semiconductor ceramic, or a magnetic ceramic.

Also, the present invention is not limited to the preferred embodiments of the present invention and the experimental example in other aspects, including the materials defining the internal conductors and the external terminal electrodes, the shape of the connection portions connecting together the exposed portions of the internal conductors, and the methods for forming the connection portions and the external terminal electrodes. In such aspects, various applications and modifications are permitted within the scope of the invention.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:
1. A multilayer electronic component comprising:
  a ceramic body including a plurality of laminated ceramic layers and having a first main surface and a second main surface that are opposite to each other and a plurality of side surfaces connecting the first and second main surfaces;
  internal conductors disposed in the ceramic body and having exposed portions at at least one of the plurality of side surfaces, the exposed portions being arranged so as to be adjacent to each other in a lamination direction of the ceramic layers;
  a connection portion disposed on the at least one of the plurality of side surfaces of the ceramic body and extending from the internal conductors in the lamination direction of the ceramic layers so as to connect at least one pair of the adjacent exposed portions to one another, the connection portion being disposed in a recess defined by a partially removed portion of the at least one of the plurality of side surfaces; and
  external terminal electrodes disposed on at least one of the plurality of side surfaces and arranged to cover the exposed portions of the internal conductors and the connection portion, each of the external terminal electrodes including a base plating film directly plated on the at least one of the plurality of side surfaces.
2. The multilayer electronic component according to claim 1, wherein each pair of the adjacent exposed portions of the internal conductors exposed at the at least one of the plurality of side surfaces are connected to another by the connection portion.

3. The multilayer electronic component according to claim 1, wherein the internal conductors include effective internal conductors that effect electrical characteristics and dummy internal conductors that do not substantially affect the electrical characteristics.

4. The multilayer electronic component according to claim 3, wherein the exposed portions of the effective internal conductors and the exposed portions of the dummy internal conductors are alternatively arranged on the at least one of the plurality of side surfaces in the lamination direction of the ceramic layers.

5. The multilayer electronic component according to claim 1, wherein the plurality of side surfaces include a first side surface and a second side surface that are opposite to each other and a third side surface and a fourth side surface that are opposite to each other, the exposed portions of the internal conductors being arranged so as to be exposed at the first and third side surfaces.

6. The multilayer electronic component according to claim 5, wherein the exposed portions of the internal conductors are continuously exposed at the first, second, and third side surfaces.

7. The multilayer electronic component according to claim 1, wherein the plurality of side surfaces include a first side surface and a second side surface that are opposite to each other and a third side surface and a fourth side surface that are opposite to each other, the exposed portions of the internal conductors being arranged so as to be exposed at the first, third, and fourth side surfaces.

8. The multilayer electronic component according to claim 7, wherein the exposed portions of the internal conductors are continuously exposed at the first, third, and fourth side surfaces.

9. The multilayer electronic component according to claim 1, wherein the adjacent exposed portions of the internal conductors are arranged in columns in the lamination direction of the ceramic layers, individual columns of the exposed portions being covered by the external terminal electrodes.

10. A method for producing a multilayer electronic component including a ceramic body including a plurality of laminated ceramic layers, internal conductors disposed in the ceramic body and having exposed portions at a side surface of the ceramic body, and external terminal electrodes disposed on the side surface of the ceramic body, electrically connected to the internal conductors, and covering the exposed portions of the internal conductors, the method comprising the steps of:
  forming the ceramic body so that the exposed portions of the internal conductors are arranged so as to be adjacent to each other in a lamination direction of the ceramic layers;
  forming a connection portion connecting at least one pair of the adjacent exposed portions on the side surface in which the internal conductors are exposed by polishing the side surface so as to elongate the exposed portions of the internal conductors; and
  forming the external terminal electrodes on the ceramic body by forming a base plating film on the side surface of the ceramic body by direct plating so as to cover the exposed portions of the internal conductors and the connection portion.

* * * * *